United States Patent
Brodbeck et al.

(10) Patent No.: US 9,971,727 B2
(45) Date of Patent: May 15, 2018

(54) UNIVERSAL I/O SIGNAL INTERPOSER SYSTEM

(71) Applicant: PHOENIX CONTACT DEVELOPMENT AND MANUFACTURING, INC., Middletown, PA (US)

(72) Inventors: Craig Alan Brodbeck, Lancaster, PA (US); Michael Anthony Correll, Hershey, PA (US); Talon Coe Kephart, Lancaster, PA (US); Stephen Craig Klinger, Hummelstown, PA (US); Brian Anthony Linton, Harrisburg, PA (US); Davis Mathews, Lewisberry, PA (US); Matthew John Wynn, Elizabethtown, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 73 days.

(21) Appl. No.: 15/028,206

(22) PCT Filed: Jun. 2, 2015

(86) PCT No.: PCT/US2015/033774
§ 371 (c)(1),
(2) Date: Apr. 8, 2016

(87) PCT Pub. No.: WO2015/187687
PCT Pub. Date: Dec. 10, 2015

(65) Prior Publication Data
US 2016/0259752 A1    Sep. 8, 2016

Related U.S. Application Data

(60) Provisional application No. 62/006,320, filed on Jun. 2, 2014, provisional application No. 62/105,327, filed on Jan. 20, 2015.

(51) Int. Cl.
*G06F 13/20*    (2006.01)
*G06F 13/40*    (2006.01)
(Continued)

(52) U.S. Cl.
CPC ..... *G06F 13/4072* (2013.01); *G05B 19/0423* (2013.01); *G06F 13/4282* (2013.01);
(Continued)

(58) Field of Classification Search
None
See application file for complete search history.

(56) References Cited

U.S. PATENT DOCUMENTS

6,175,932 B1    1/2001   Foote et al.
7,713,077 B1 *  5/2010   McGowan ......... H01R 13/6315
                                                            439/249
(Continued)

FOREIGN PATENT DOCUMENTS

EP    2241980 A1     10/2010
JP    3013435 U      7/1996
JP    H09034519 A    2/1997

OTHER PUBLICATIONS

International Search Report in corresponding PCT/US15/33774, European Patent Office, dated Aug. 26, 2015, 9 pages.
(Continued)

*Primary Examiner* — Henry Tsai
*Assistant Examiner* — Aurangzeb Hassan
(74) *Attorney, Agent, or Firm* — Hooker & Habib, P.C.

(57) ABSTRACT

A universal I/O interposer system for processing an I/O signal transmitted between an I/O field device and a controller, the system includes a base connected between the field device and the controller and a number of connector halves attached to the base. An interposer circuit carrier includes a corresponding connector half and includes a signal processing circuit for processing an I/O signal being transmitted between an I/O field device and a controller. An interposer circuit carrier can be changed without disconnecting the base from the field device or controller.

20 Claims, 10 Drawing Sheets

(51) Int. Cl.
  *G05B 19/042* (2006.01)
  *G06F 13/42* (2006.01)
  *G06F 13/38* (2006.01)
(52) U.S. Cl.
  CPC ............... *G05B 2219/21116* (2013.01); *G05B 2219/31129* (2013.01); *G05B 2219/34421* (2013.01); *G06F 13/385* (2013.01); *G06F 13/4022* (2013.01); *G06F 13/4027* (2013.01)

(56) References Cited

U.S. PATENT DOCUMENTS

| | | |
|---|---|---|
| 7,822,896 B1 | 10/2010 | Sagues et al. |
| 8,332,567 B2 | 12/2012 | Burr et al. |
| 8,762,618 B2 | 6/2014 | Burr et al. |
| 9,083,548 B2 | 7/2015 | Holmes et al. |
| 2008/0126665 A1 | 5/2008 | Burr et al. |
| 2009/0271558 A1 | 10/2009 | Wormmeester et al. |
| 2010/0268850 A1* | 10/2010 | Burton .................. G06F 13/409 710/3 |
| 2014/0149630 A1 | 5/2014 | Burr et al. |
| 2015/0127876 A1 | 5/2015 | Emi et al. |

OTHER PUBLICATIONS

International Preliminary Report on Patentability in corresponding PCT/US15/33774, US Patent and Trademark Office, dated Feb. 19, 2016, 4 pages.

Patent Translate (EPO.org), Machine translation to English of JPH9034519, 12 pages.

Japanese Patent Office, English-language translation of office action in corresponding application JP 2016-570872, dated Nov. 7, 2017, 3 pages.

\* cited by examiner

UNIVERSAL I/O SIGNAL INTERPOSER SYSTEM

FIELD OF THE DISCLOSURE

The disclosure relates to transmission of an I/O signal between an I/O device and a controller for process control, and in particular, to a system interposed in the signal path that processes the I/O signal between the end points of the signal.

BACKGROUND OF THE DISCLOSURE

Control systems transmit I/O signals to and from field devices and controllers to regulate and control industrial processes. Field devices include sensors and actuators. Sensors transmit input signals representing the state of process variables to the controllers, and actuators receive output signals from the controllers and take action to affect process variables. Controllers may be connected directly to field devices and have fixed I/O capabilities, or may use I/O cards to provide additional capacity. Some controllers connect to remote I/O racks that communicate I/O signals with the controller over a digital bus or network.

I/O signals may be analog signals or digital signals. Analog I/O signals are variable, in which a voltage or current represents the magnitude of a process parameter such as flow rate or the desired position of a valve. Digital I/O signals represent one of two states: "on/off", "opened/closed", and the like.

A second type of digital output signal used in process control is used to actuate a relay. Many control tasks require relays that connect field devices such as actuators or motors to power sources for operation of the actuators or motors. The digital output signal opens or closes the relay to power off or power on the actuator or motor. The "Generation 4" or "G4" digital I/O line sold by Opto 22, Temecula, Calif., USA, for example, markets separate digital input modules and digital output modules for operating relays.

Sophisticated industrial processes may use a number of field devices and controllers distributed throughout the plant for process control. I/O wiring from the field devices is often brought to a central location for ease of management. The field wiring may extend to a terminal block contained in a wiring cabinet, and from the terminal block extend to the controllers.

Sensors and other field devices often require continuous power for operation. A field device may be powered through the I/O signal line or may receive power through a separate power line. Substantial engineering effort is required to define the power needs of the field devices and to arrange power distribution to the field devices during the initial planning stages of a control system. As field devices are replaced or updated, the power and power distribution requirements of the control system may also change. Additional engineering effort is required to respond to these changes.

During the initial commissioning of a control system, extensive testing of I/O signal quality may be required to assure proper installation and operation of the control system.

I/O signals may require signal conditioning for proper operation of the control system. I/O wiring from the field devices can be brought to modular signal conditioners housed in the cabinet, and from the signal conditioners to the controllers. An example of signal conditioners include the "MINI Analog Pro" line available from Phoenix Contact GmbH & Co., Blomberg, Germany. Changing a signal conditioner requires disconnecting the I/O wiring from the old signal conditioner and reconnecting the wiring to the new signal conditioner.

There is a need for an improved I/O signal conditioning system that can be interposed between field devices and controller that better addresses the diagnostic, power, and connection needs of a control system.

BRIEF SUMMARY OF THE DISCLOSURE

Disclosed is a universal I/O interposer system for processing an I/O signal transmitted between an I/O field device and a controller. The system includes a base connected between the field device and the controller and one or more connector attached to the base. An interposer circuit carrier includes a corresponding connector half and includes a signal processing circuit for processing an I/O signal being transmitted between an I/O field device and a controller.

An interposer circuit carrier can be changed without disconnecting the base from the field device or controller.

Embodiments of the interposer circuit carrier include different types of signal processing circuits, including, but not necessarily limited to, pass-through circuits, signal conditioning circuits, electrical protection circuits, and relay circuits.

Yet other embodiments of the interposer circuit carrier include access ports that provide access to the signal path for I/O signal diagnostics.

In yet other embodiments of the interposer circuit carrier, power can be transmitted through the interposer system to the field device. This simplifies power arrangement needs when planning a new installation or when replacing or adding field devices to an existing control system.

The disclosed universal I/O interposer system offers a number of advantages. During the initial commissioning of a control system or installation of a new field device, an interposer circuit carrier can be used with fusing elements or access ports for added circuit protection and diagnostic access. The carrier can later be replaced with a carrier without access points and/or with different fusing elements.

If signal conditioning needs change during the lifetime of a field device, a different interposer circuit carrier can be installed without disconnecting the I/O wiring at the base.

Other objects and features will become apparent as the description proceeds, especially when taken in conjunction with the accompanying drawing sheets illustrating one or more embodiments.

DETAILED DESCRIPTION

Figure 1:
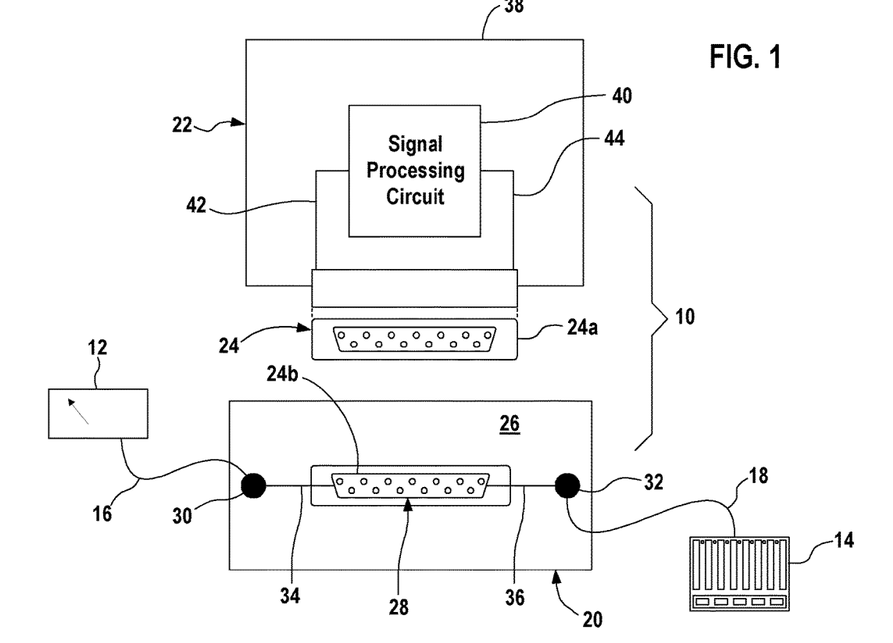
FIG. 1 illustrates a universal I/O interposer system for processing an I/O signal transmitted between an I/O device and a controller.

FIG. 1 illustrates a universal I/O interposer system 10 for intercepting and processing an I/O signal transmitted between an I/O device 12 and a controller 14. The interposer system 10 is shown connected to the I/O device 12 by a wire or signal line 16 and connected to the controller 14 by a wire or signal line 18. Although FIG. 1 illustrates the signal lines 16, 18 extending directly from the I/O device 12 and the controller 14 to the I/O interposer system 10, it should be understood that the signal lines can be routed in other ways to and from the I/O interposer system 10 as is known in the art. For example, the signal line 18 may extend to an I/O card or I/O rack connected to a controller of a distributed control system.

An I/O device 12 includes input/output functionality, that is, the I/O device 12 can output a signal that is received by the I/O interposer system 10 through the line 16 for transmittal to the controller 14 through line 18, or can receive as input a signal output by the controller 14 that is received by the I/O interposer system 10 through the line 18 for transmittal to the I/O device 12 through the line 16. The I/O interposer system 10 enables the signal received by the I/O system 10 through the line 16 or the line 18 to be intercepted and processed or otherwise evaluated or treated before being output from the I/O system 10 through the other of the line 16 or the line 18. From the viewpoint of the I/O device 12, the I/O device receives or transmits I/O signals from or to the controller 14 on the line 16. From the viewpoint of the controller 14, the controller 14 receives or transmits I/O signals from or to the I/O device 12 on the line 18.

In embodiments described in more detail later, the I/O interposer system 10 can also supply power to the I/O device 12.

The I/O interposer system 10 includes a base assembly 20, an interposer circuit carrier 22, and an electrical connector 24. The electrical connector 24 is an interface that removably attaches the circuit carrier 22 to the base assembly 20. The electrical connector 24 also provides electrical connections between the base assembly 20 and the circuit carrier 22 when the carrier 22 is attached to the base assembly 20.

The electrical connector 24 includes a first connector half 24a attached to and forming part of the circuit carrier 22, and a second connector half 24b attached to and forming part of the base assembly 20.

The illustrated electrical connector 24 is a conventional pin-and-socket type electrical connector includes pins and the other connector pin includes corresponding sockets that receive the pins. Although a D-sub connector is shown, other types of electrical connectors (including but not limited to terminal blocks, plug/socket connectors, or RS232, USB, RS46, RJ45, or RS422/485 connectors) can be used to provide mechanical and electrical connections between the base assembly 20 and the circuit carrier 22. The electrical connector and/or the base may include keying or coding elements or other structure that assures correct mating engagement of the connector halves. The base assembly 20 may also include guide structure (not shown) that facilitates proper alignment of the connector halves 24a, 24b when connecting the connector halves.

The base assembly 20 includes a printed circuit board (PCB) 26 that carries a base interposer circuit segment 28. The base interposer circuit segment 28 includes the connector half 24b and further includes a device terminal 30 for electrical connection with the I/O device 12 and a controller terminal 32 for electrical connection with the controller 14. The base interposer circuit segment 28 further includes circuit portions provided by the PCB 26, these circuit portions including electrical circuit communication 34 between the device terminal 30 and the connector half 26b and provides electrical circuit communication 36 between the controller terminal 32 and the connector half 24b.

The base interposer circuit segment 28 forms a normally open electrical connection extending from the device terminal 30 to the controller terminal 32.

The illustrated interposer carrier 22 has a housing 38 that carries the connector half 24a. Disposed in the housing is a signal processing circuit 40 in electrical circuit communication with the connector half 24a through an I/O circuit section 42 and an I/O circuit section 44.

Figure 2:
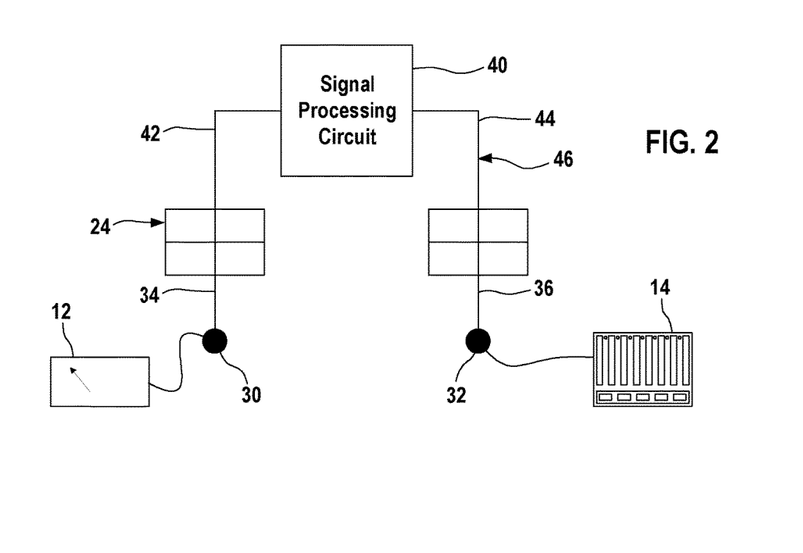
FIG. 2 illustrates a circuit formed by the universal I/O interposer system connecting the I/O device and the controller.

As shown in FIG. 2 when the interposer circuit carrier 22 is connected to the base interposer circuit segment 28, the electrical connector 24 places the I/O circuit sections 42, 44 in series with the respective base circuit sections 34, 36. The interposer circuit carrier 22 and the base interposer circuit segment 28 cooperatively form a closed interposer circuit segment 46 extending from the device terminal 30 to the controller terminal 32. The base interposer circuit segment 28 and the interposer circuit carrier 22 enable additional signal processing or other functionality to be interposed in the I/O signal path extending between the I/O device 12 and the controller 14. An I/O signal passing between the terminals 30, 32 is intercepted and processed by the interposed signal processing circuit 40. An I/O signal received into the interposer system 10 is processed by the interposer system 10 and then transmitted out of the system 10.

Figure 3:
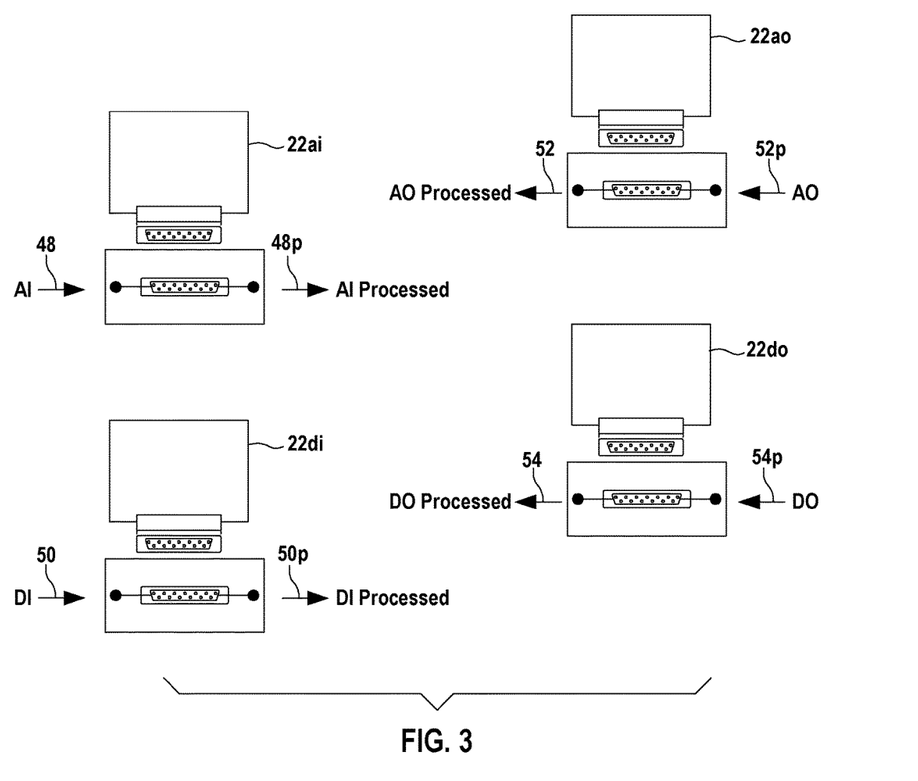
FIG. 3 illustrates the I/O signals that can be processed by the universal I/O accessory system.

FIG. 3 illustrates the type of I/O signals that can be received by the interposer system 10. A signal output by the I/O device 12 for transmittal to the controller 14 is considered an input signal with respect to the system 10. A signal output by the controller 14 for transmittal to the I/O device 12 is considered an output signal with respect to the system 10. As is known in the art, I/O signals can be analog signals or can be digital signals. Thus the base interposer circuit segment 28 may be connected between the I/O device 12 and the controller 14 to receive at the device-terminal 30 an analog in signal 48 or a digital in signal 50, or to receive at the controller terminal 32 an analog out signal 52 or a digital out signal 54.

An interposer circuit carrier 22 is configured to process either a digital I/O signal or to process an analog I/O signal. An accessory circuit carrier 22 that is configured to process an analog signal is an analog accessory circuit carrier. An accessory circuit carrier 22 that is configured to process a digital signal is a digital accessory circuit carrier. The "polarity" of an accessory circuit carrier 22 is determined by whether the I/O signal is received through the I/O circuit section 42 or through the I/O circuit section 44. An accessory circuit carrier 22 that is configured to process an input signal received through the I/O circuit section 42 is an input circuit carrier. An accessory circuit carrier 22 that is configured to process an output signal received through the I/O circuit section 44 is an output carrier.

An interposer circuit carrier 22 may in different embodiments be an analog input circuit carrier, an analog output circuit carrier, a digital input circuit carrier, or a digital output circuit carrier. A user selects the appropriate type and polarity of circuit carrier 22 for use in the system 10 based on the signal type (analog or digital) and the polarity (input or output) of the I/O signal to be transmitted between the I/O device 12 and the controller 14. If the signal specifications change, or if the I/O device 12 is replaced with a different type of I/O device, the accessory circuit carrier 22 used in the system 10 changes accordingly.

As shown in FIG. 3, an analog input circuit carrier 22*ai* receives an analog input signal 48 from the device terminal 30 and outputs a processed analog input signal 48*p* to the controller terminal 32. A digital input circuit carrier 22*di* receives a digital input signal 50 from the device terminal 30 and outputs a processed digital input signal 50*p* to the controller terminal 32. An analog output circuit carrier 22*ao* receives an analog output signal 52 from the controller terminal 32 and outputs a processed analog output signal 52*p* to the device terminal 30. A digital output circuit carrier 22*do* receives a digital output signal 54 from the controller terminal 32 and outputs a processed output signal 54*p* to the device terminal 30.

Figure 4:
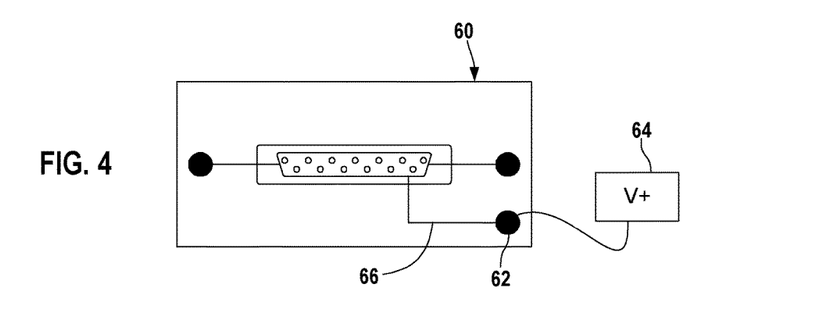
FIG. 4 illustrates an embodiment of the universal I/O accessory system capable of providing power to the I/O device.
Figure 5:
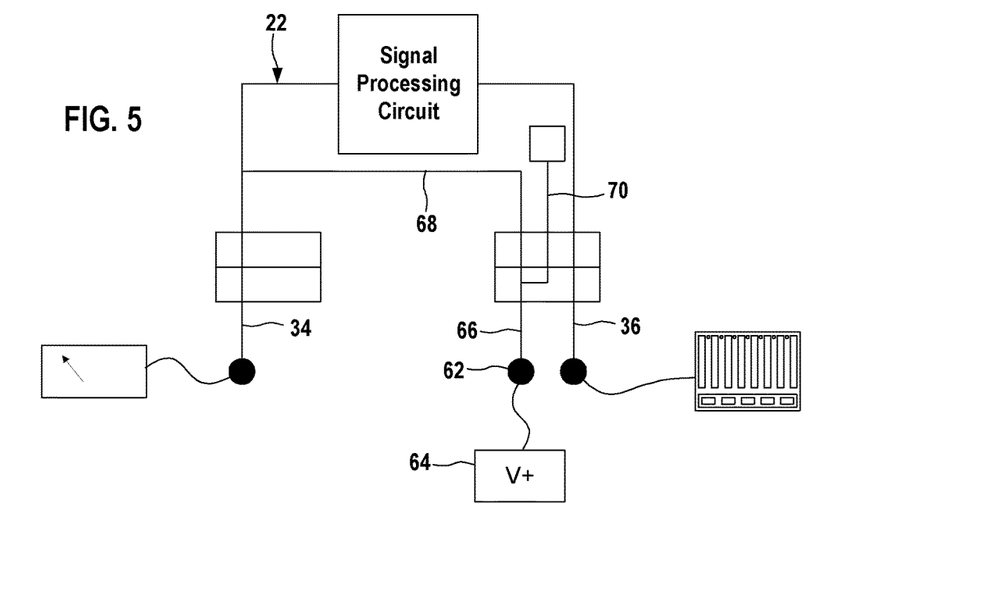
FIG. 5 is similar to FIG. 2 but illustrates a circuit formed by the universal I/O accessory system shown in FIG. 4.

FIG. 4 illustrates a second embodiment base assembly 60 that is similar to the base assembly 20 but can supply power to the I/O device 12. The base interposer circuit segment of the base assembly 60 includes a power supply terminal 62 that is shown connected to a voltage source 64. The voltage source in the illustrated embodiment is a 24 volt DC voltage source. The base assembly PCB provides electrical circuit communication 66 between the power terminal 62 and the connector half 26*b*. As shown in FIG. 5, the circuit carrier for use with the base assembly 60 includes a jumper 68 whose ends are connected to the connector half 24*a*. When the circuit carrier 22 is connected to the base assembly 60 the electrical connector 24 places the jumper 68 in series with the base circuit sections 66, 33. Power is supplied from the voltage source 64 to the I/O device 12 through the line 16.

An interposer circuit carrier 22 is also a power circuit carrier if the carrier is configured to supply power to the device terminal 24. An interposer circuit carrier is a non-power circuit carrier if the carrier is not configured to supply power to the device terminal 30.

The circuit carrier 22 shown in FIG. 5 also includes an internal power distribution circuit 70 that receives power from the voltage source 64 to power the internal circuitry of the circuit carrier itself. An interposer circuit carrier 22 can be a base-powered circuit carrier that is powered through the base assembly 60 independently of the signal being processed by the carrier. In other embodiments an interposer circuit carrier 22 could be signal powered, that is, the circuit carrier 22 utilizes power from the signal being processed to power the circuit carrier.

It should be understood that embodiments disclosed herein that are capable of supplying power to the device terminal 30 can be configured in alternative embodiments to supply power to the controller terminal 32.

Figure 6:
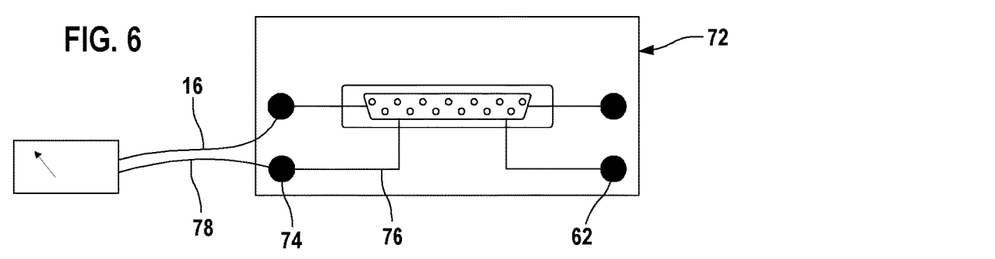
FIG. 6 is similar to FIG. 4 but illustrates an embodiment of the universal I/O interposer system that provides power and a signal path to the I/O device over separate transmission lines.

FIG. 6 illustrates a third embodiment base assembly 72 similar to the base assembly 60. The signal interconnection circuit of the base assembly 72 includes a second device-side terminal 74 that is connected to the electrical connector half 24*b* by electrical circuit communication 76. The interposer circuit carrier 22 used with the base assembly 72 interconnects the power supply terminal 62 with the terminal 74. A power line is connected to the terminal 74 and to the I/O device 12 to supply power to the I/O device through a power line 78 separate from the I/O device signal line 16.

FIG. 6 illustrates that a signal interconnection circuit may include a plural number of terminals for connections with an I/O device 12. Additional terminals could be provided, for example, to terminate shield conductors extending from the I/O device.

Figure 7:
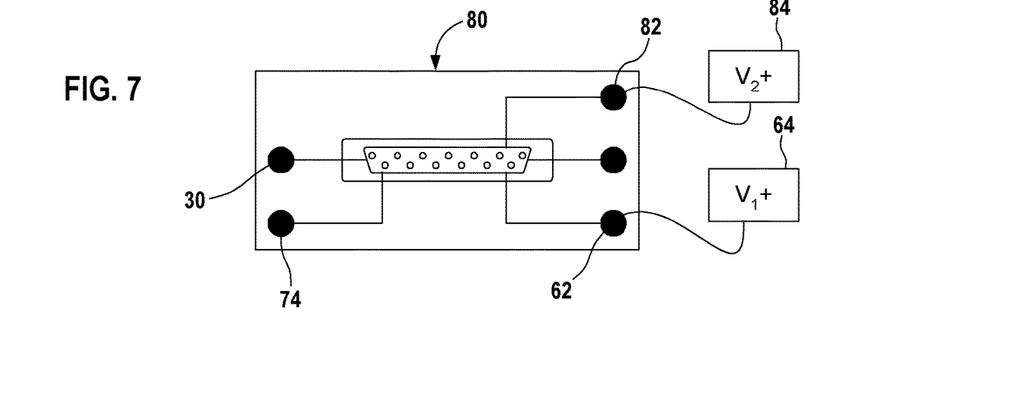
FIG. 7 illustrates an embodiment of the universal I/O interposer system capable of providing power to the I/O device, the power selectable from more than one source of supply.

FIG. 7 illustrates a fourth embodiment base assembly 80 similar to the base assembly 72. The signal interconnection circuit of the base assembly 80 includes a second power supply terminal 82 in addition to the power supply terminal 62. Power supply terminal 82 is shown connected to a second voltage source 84 that supplies a different voltage than does the voltage source 64. When an interposer circuit carrier 22 configured to interconnect the power supply terminal 62 to the device power terminal 74 is used, power can be transmitted from the voltage source 54 to the I/O device 12 through the power line 78 as was shown in FIG. 6. When an interposer circuit carrier 22 configured to interconnect the power supply terminal 82 to the device terminal 30 is used, power can be transmitted from the voltage source 84 to the I/O device 12 through the I/O device signal line 16 as was shown in FIG. 4.

Figure 8:
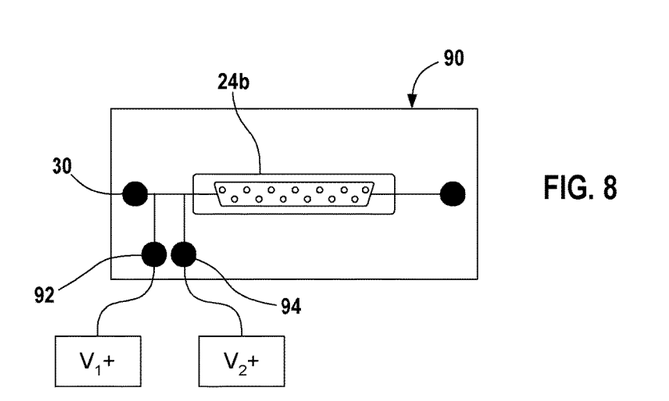
FIG. 8 illustrates an embodiment of the universal I/O interposer system in which power is provided to the I/O device independently of the interposer circuit carrier.

FIGS. 4-7 illustrate supplying power to the I/O device 12 utilizing the interposer circuit carrier 22 to connect a power supply terminal with a device terminal. FIG. 8 illustrates a fifth embodiment base assembly 90 that includes power supply terminals 92, 94 similar to the power supply terminals 62, 82. In this embodiment, however, the power supply terminals 62, 82 are electrically connected to the base interposer circuit segment 28 between the electrical connector half 24*b* and the device terminal 30. Power can be supplied to the device terminal 30 independently of the presence of the interposer circuit carrier 22. A power supply terminal may be connected to a dedicated device power terminal similar to the power terminal 74 in other possible embodiments.

Figure 9:
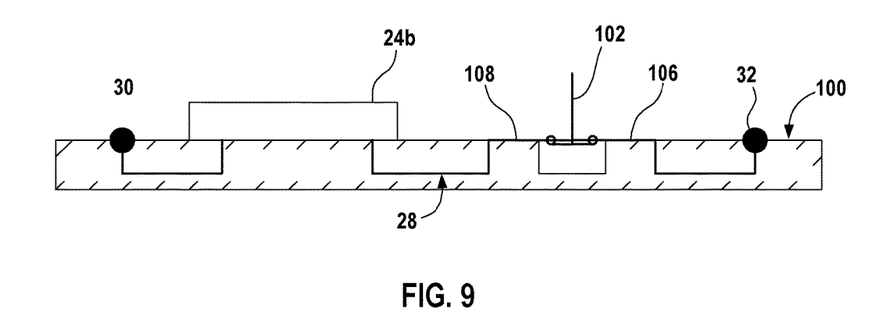
FIG. 9 is a schematic sectional view of a base assembly of an embodiment of the universal I/O interposer system.

The base interposer circuit segment 28 may also include additional devices in the signal path to process the signal or to provide diagnostic capabilities or other functionality regardless of or independent of the interposer circuit carrier being used. FIG. 9 illustrates a sixth embodiment base assembly 100 that is similar to the base assembly 20 but includes a manual pushbutton break 102 disposed in the base interposer circuit segment 28. The circuit segment 28 includes exposed test points 104, 106 on opposite sides of the break 102. A user can manually open an active circuit with the break 102 and place probes on the test points 104, 106 to monitor signal quality for testing or diagnostic purposes. Dust covers can be provided to cover the test points 104, 106 when not in use.

Other devices or circuit elements that could optionally be incorporated into the base interposer circuit segment 28 to provide functionality independently of the accessory circuit carrier include fuses, isolation elements, signal repeaters, and the like.

Figure 10:
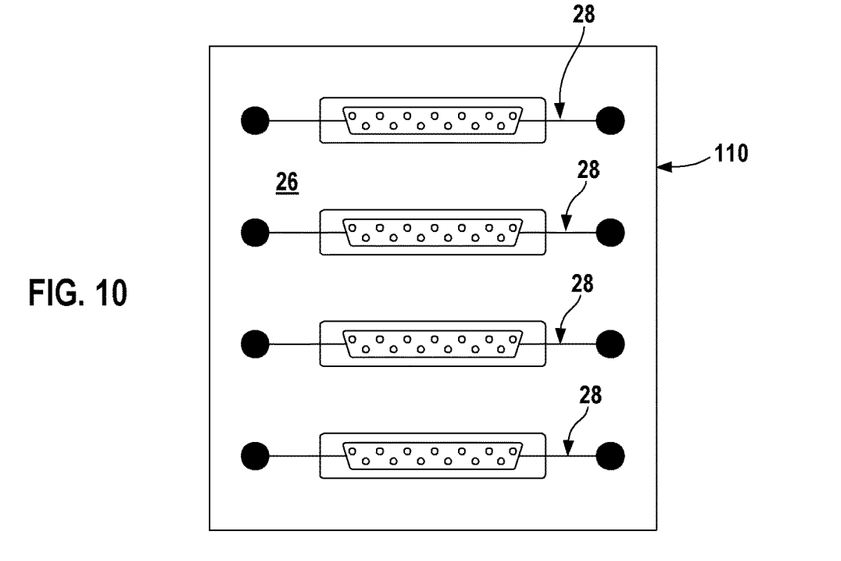
FIG. 10 illustrates an embodiment of a base for the universal I/O accessory system having multiple field-side and multiple controller-side terminals for simultaneous connection of multiple I/O devices to the controller.

FIG. 10 illustrates a seventh embodiment base assembly 110 that is similar to the base assembly 20 but includes a plural number of like base interposer circuit segments 28 on the PCB 26. Each base interposer circuit segment 28 of the base assembly 110 in FIG. 10 is independent of the other interposer segments. Each base interposer circuit segment is shown as being similar to the circuit segment 28 shown in FIG. 1, but it should be understood that some or all of the interposer segments 28 may include additional power supply terminals, device power terminals, and additional devices or circuit elements in the signal path as previously described and as previously shown in FIGS. 1-9.

Because the base interposer circuit segments 28 are independent of one another, the type and polarity of an I/O device connected to one interposer segment 28 is independent of the type and polarity of an I/O device connected to any other of the interposer segments 28. Replacing an I/O device connected to an interposer segment 28 does not affect the other I/O devices connected to the other interposer segments 28, even if such change requires changing the type or polarity of the interposer circuit carrier of that base interposer circuit segment.

Furthermore, signal processing and other functionality interposed in the signal path of each interposer segment 28 by that interposer segment 28 is independent of the signal processing injected into the respective signal paths of the other interposer segments 28. The type and polarity of the interposer circuit carrier 22 used in each interposer segment 28 is independent of the type and polarity of the interposer circuit carrier 22 used in the other interposer segments 28. The choice to supply power to an I/O device connected to each interposer segment 28 is made independently of any power requirements of the other interposer segments 28. Additional devices or functionality disposed in each interposer segment 28 act independently of like devices or functionality in the other interposer segments 28. For example, opening a signal circuit with a break 102 in one interposer segment 28 does not affect the other interposer segments 28. Changing an I/O device connected to one interposer segment 28 does not affect the other interposer segments 28 nor does it require changing the interposer circuit carriers 22 used in the other interposer segments 28.

FIG. 10 illustrates four base interposer circuit segments 28 and is not intended to be limiting. Embodiments having 32, 64, or more interposer segments 28 are within the scope of the disclosure.

Figure 11:
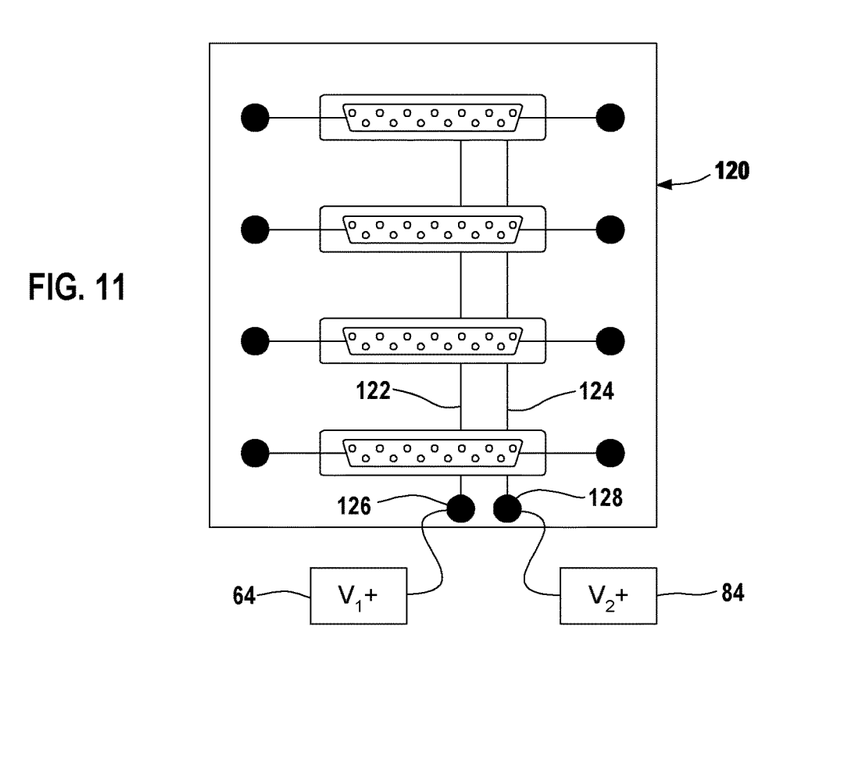
FIG. 11 is similar to FIG. 10 but illustrates an embodiment of the base having two separate power supply busses connecting the pin connections of the base.

FIG. 11 illustrates an eighth embodiment base assembly 120 that is similar to the base assembly 110. In this embodiment power is made available from a voltage source to each interposer segment 28 through a bus rather than through a dedicated power supply terminal for each interposer segment 28. FIG. 11 illustrates power supply busses 122, 124 having respective bus supply terminals 126, 128. Respective voltage sources 64, 84 are shown connected to the bus supply terminals 126, 128. Corresponding pins of each electrical connector half 24b are connected to respective busses 122, 124. A power-type interposer circuit carrier 22 configured to connect to either bus 122 or to bus 124 supplies power from the bus to the device terminal 30 or power terminal 74 of the interposer segment 28 as previously described.

In yet other embodiments, a bus similar to the bus 122 or the bus 124 is provided that is dedicated to making power available for use by the interposer circuit carriers 22 attached to the interposer segments 28. In yet further embodiments, a bus similar to the bus 122 or the bus 124 is provided that can independently power tools or diagnostic devices in use in association with the base assembly 120. For example, a power port could be provided for each interposer segment 28 for powering a hand-held diagnostic device attached to the test ports 102, 104 of an interposer segment 28.

Figure 12:
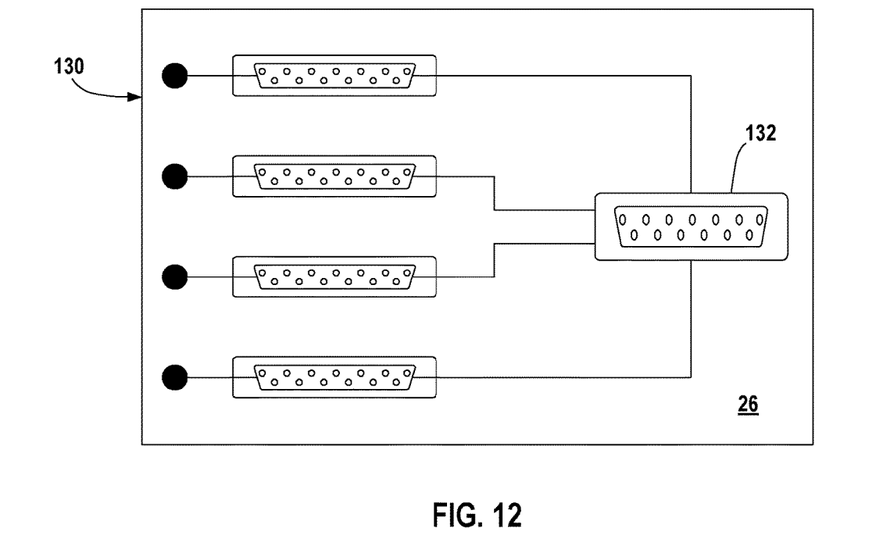
FIG. 12 is similar to FIG. 10 but with the controller-side terminals forming part of an electrical connector half.

FIG. 12 illustrates a ninth embodiment base assembly 130 that is similar to the base assembly 120. In this embodiment the controller terminals 32 of the interposer segments 28 are formed as pins and arranged to form a pin connector half 132 attached to the PCB 26. The illustrated pin connector half 132 is half of a conventional D-sub connector. The size, configuration, and number of pins of the pin connector half 132 is selected independently of those used for the electrical connector halves 24a or 24b.

Figure 13:
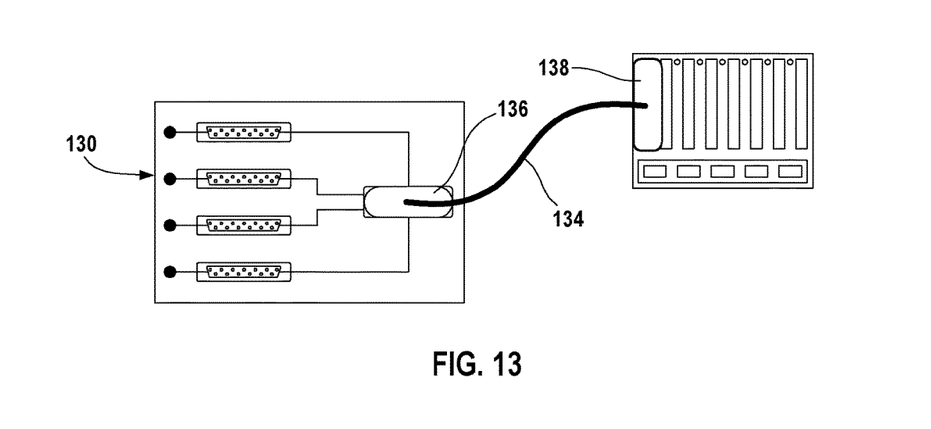
FIG. 13 illustrates the base shown in FIG. 12 connected to the controller via the electrical connector half.

Arranging the controller terminals 32 as a connector half enables convenient connection of multiple controller I/O lines 18 extending from the base assembly 130 to the controller 14. FIG. 13 illustrates a cable 134 connecting the base assembly 130 with the controller 14. The cable 134 has an electrical connector half 136 compatible with the connector half 132 on one end of the cable, and a connector half 138 compatible with a controller connector half on the other end of the cable. The cable 134 provides simultaneous connection of a plural number of I/O signal wires.

Known I/O aggregation or electronic marshalling devices utilize a standard or proprietary connector half that mates with a corresponding connector half of a multi-wire I/O cable to connect the marshalling device to the I/O signal lines. In embodiments the connector half 138 is configured to connect with the connector half of the aggregation or marshalling device. In such uses the base assembly 130 is not directly attached to the controller 14 but is instead connected through an intermediary marshalling device.

Non-limiting examples of I/O aggregation or electronic marshalling devices that could be connected to the base assembly 130 by use of a suitable cable include, among others, the DELTAV CHARMS (trademark) electronic marshalling I/O hardware sold by Emerson Process Management and the EXPERION UNIVERSAL PROCESS I/O hardware sold by Honeywell International Inc.

FIG. 12 illustrates all the controller terminals 32 of the base assembly 130 being contained in a single connector half 138. In other embodiments the controller terminals 32 are organized into a plural number of connector halves 138. For example, a base assembly having 32 interposer segments 28 has the controller terminals 32 arranged in two groups of 16 terminals, each terminal group forming a respective connector half 132. In other embodiments, only some of the controller terminals 42 form part of a connector half 138; the other controller terminals 32 can remain arranged similar to the arrangement shown in FIG. 10.

Figure 14:
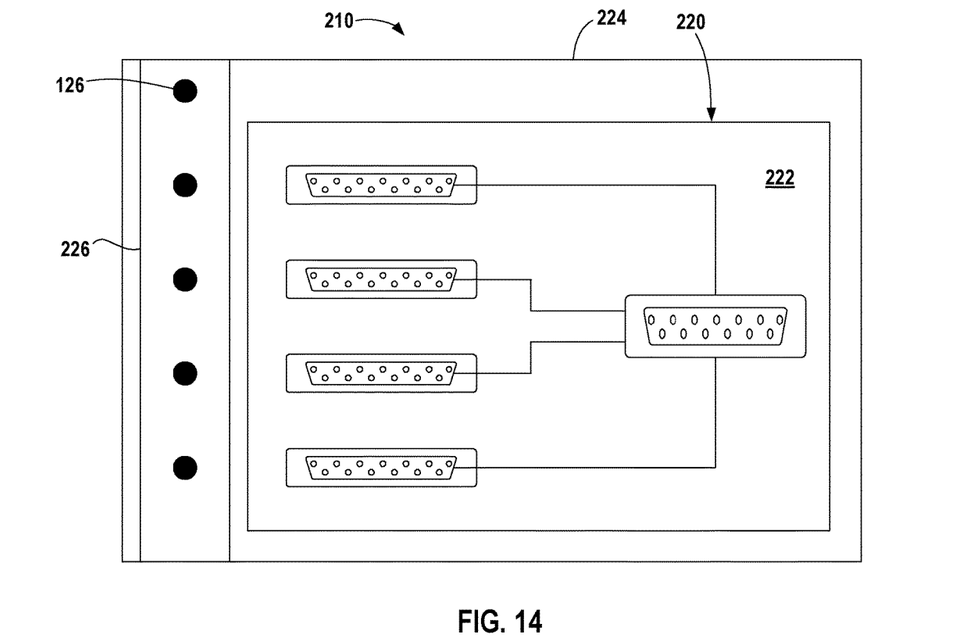
FIG. 14 illustrates the base of a universal I/O accessory system mounted on a housing that includes a terminal block for the field-side terminals of the system.

FIG. 14 illustrates a universal I/O interposer system 210 similar to the system 10 that includes a base assembly 220 similar to the base assembly 140. In this embodiment the PCB base 222 of the base assembly 220 is mounted on a housing 224. The device terminals 30 are contained within a terminal block 226 forming part of the housing 224. Conductors (not shown) extend from the terminal block 226 to the PCB base 222 to form the required electrical connections. The terminal block 226 may also include additional terminals for power and power supply connections as described above. For example, the terminal block 226 includes a power supply terminal (BUS TERMINAL) for providing power to the power bus (not shown).

Figure 15:
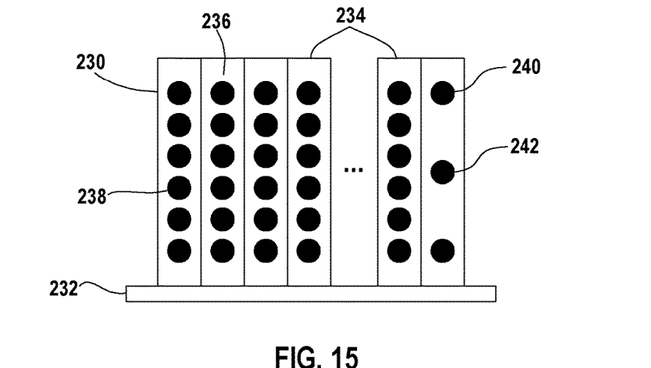
FIG. 15 illustrates the housing formed from individual housing slices.

FIG. 15 illustrates a housing 230 of a universal I/O interposer system that is similar to the I/O system 210. The housing 230 is shown mounted on a DIN rail 232.

The housing 230 is formed from a number of housing slices 234 placed side-by-side along the DIN rail 232. Each housing slice 234 is associated with a respective interposer segment 28 and includes a modular terminal block 236 that contains the device terminals 238 (signal, power, and shield terminals) for the interposer segment 28. In alternative embodiments multiple housing slices 234 are associated with a respective interposer segment 28. The terminal block 236 spaces the terminals 238 vertically, that is, transverse to the DIN rail axis. The illustrated housing 230 includes an additional housing slice 240 for power supply terminals 242. The power supply terminals 242 may be configured to connect to a 24v DC voltage source for supplying power to the controller through an interposer circuit carrier 22, a 24 DV voltage source for supplying power to an I/O device through an interposer circuit carrier 22, and for optional connection to a third voltage source up to 125V for optional power.

The housing 230 may include a ground connection electrically connecting the DIN rail 232 with the PCB base 26. Each interposer segment 28 may include electrical connections to tie shielding of all signal lines to the DIN rail ground, to tie field shields or cable shields to the DIN rail ground, or to an alternate ground.

An example of a modular housing that can be adapted for forming the housing 230 is disclosed in Correll U.S. Pat. No. 7,462,063 "Modular Terminal Block", which patent is incorporated by reference as if fully set forth herein.

Figure 16:
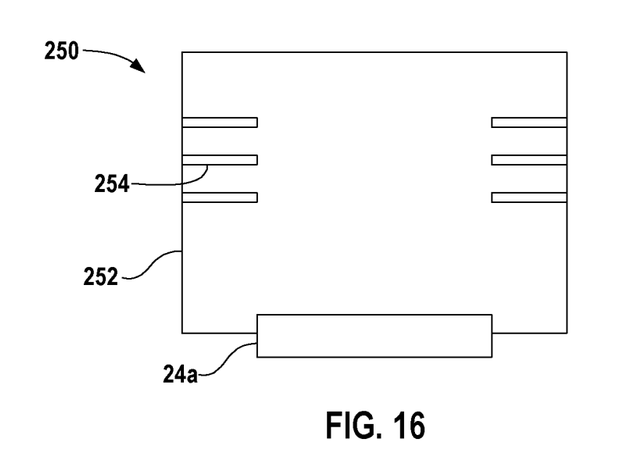
FIG. 16 illustrates a first embodiment interposer circuit carrier housing.
Figure 17:
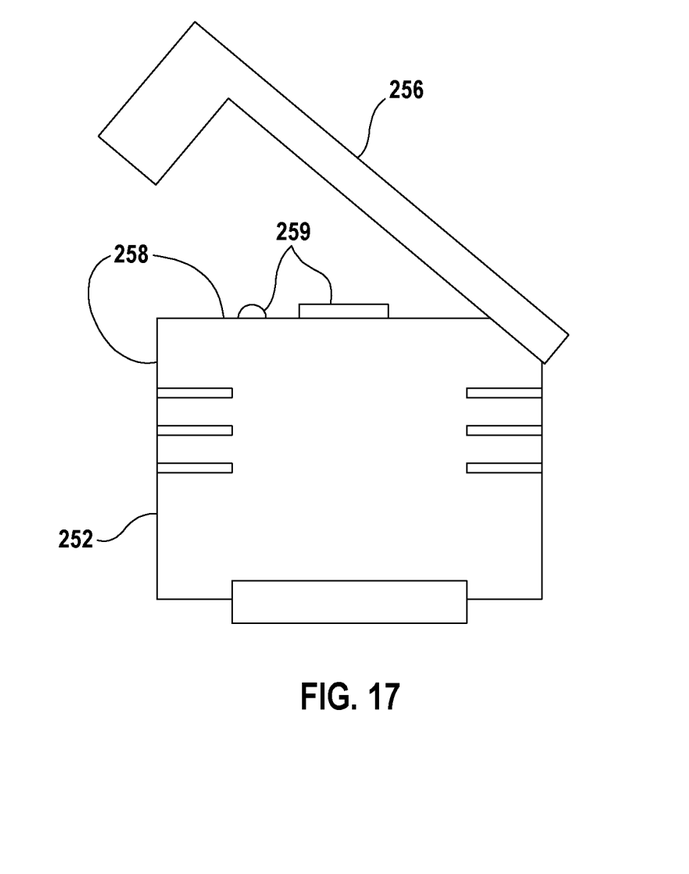
FIG. 17 illustrates a second embodiment interposer circuit carrier housing.

FIGS. 16 and 17 illustrate two embodiments of the housing 38 of the interposer circuit carrier 22.

FIG. 16 illustrates a housing 250 that has a rigid, generally prismatic body 252. The electrical connector half 24a is located at the bottom of the body 252. The housing 250 may include ventilation slots 254 or the like to dissipate heat. The housing 250 may include guide surfaces, keying and coding structures, latching mechanisms, and the like to align, engage, and releasably retain the interposer circuit carrier 22 on the base connector half 24b.

FIG. 17 illustrates a housing 260 that is similar to the housing 250 but includes a hinged dust cover 256. The dust cover 256 is pivotable between closed and opened positions. When in the closed position the dust cover 256 closely covers an outer surface 258 of the housing body 252 When in the opened position the dust cover 256 is spaced away from the surface 258 to provide access to the surface 254. In embodiments of the interposer circuit carrier described below, test points, breaks, switches, visual indicators, fuses, and other circuit elements 259 may be positioned on or along the surface 258. The dust cover 256 provides environmental protection of those circuit elements while still providing user access to them. A translucent dust cover permits use of visual indicators while the dust cover is closed.

Described below are non-limiting examples of different types of signal processing circuits 40. The illustrated signal processing circuits 40 are in four major categories:

(1) feed-through or pass-through circuits,
(2) electrical protection circuits,
(3) signal conditioning circuits, and
(4) relay circuits.

An interposer circuit carrier 22 implementing one of the illustrated processing circuits 40 may also be configured to transmit power from a voltage source to the device terminal 30 or controller terminal 32 as previously described.

Figure 18:
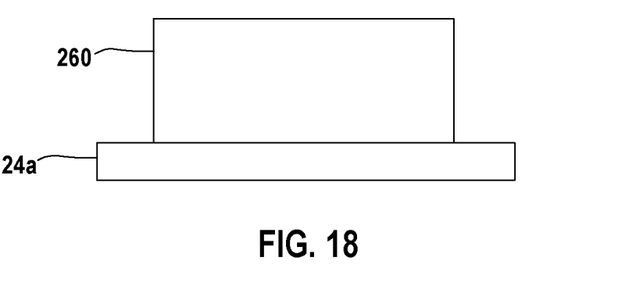
FIG. 18 illustrates the signal processing circuit of the interposer circuit carrier configured as a feed-through circuit.

FIG. 18 illustrates a feed-through circuit 260. The feed-through circuit 260 provides a passive 1:1 connection in which the I/O signal (analog or digital) into the circuit 260 is identical to the I/O signal out of the circuit 260. The same feed-though circuit 260 may handle either input signals or output signals, that is, the polarity of an interposer circuit carrier 22 implementing a feed-through circuit 260 may be irrelevant.

Figure 19:
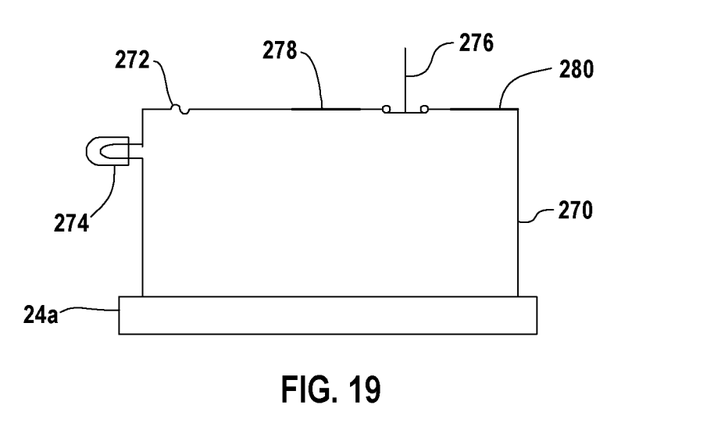
FIG. 19 illustrates the signal processing circuit of the interposer circuit carrier configured as an electrical protection circuit.

Signal processing circuits 40 configured as electrical protection circuits provide over-voltage or over-current protection. FIG. 19 illustrates a signal processing circuit configured as an electrical protection circuit 270. Protection circuit 270 includes a fusing element 272, a blown-fusing element indicator lamp 274, a manual break 276, and test points 278, 280 on opposite sides of the break 276. The illustrated fusing element 272 is a fuse, but other fusing elements known in the art include circuit breakers and the like, or other An interposer circuit carrier 22 implementing a manual break and test points may be used during initial installation and set-up of a process control system for diagnostic and test purposes of a signal line. Once the installation has been completed and verified, an interposer circuit carrier 22 with a signal processing circuit 40 that includes only a pass-through circuit or only a fuse and blown-fuse indicator lamp may be placed in the signal line.

Signal processing circuits 40 configured as signal conditioning circuits or as signal conditioners may provide, among other processing capabilities, electrical isolation of the I/O signal, signal conversion, signal amplification, signal filtering, and current monitoring. A signal conditioning circuit may be configured to condition signals received from specific sources, such as from thermocouples, resistance temperature detectors (RTDs), potentiometers, or the like, or the signal conditioning circuit may be configured to condition specific I/O signal protocols, such as HART, traditional four to 20 mA signals, and the like.

Electrical isolation or galvanic isolation of input, output, and power supply signals prevent ground loops and other sources of distortion of I/O signals. Signal conversion converts an I/O signal received into the signal processing circuit 40 to a signal more suitable with the destination controller or field device, or may convert the signal to a signal less sensitive to interference from an industrial environment. A signal amplifier provides signal transmissions over longer signal lines or provides higher signal power at the receiving end of the signal. Signal filters remove interference, such as high-frequency signal components, introduced in the I/O signal by industrial environments.

Figure 20:
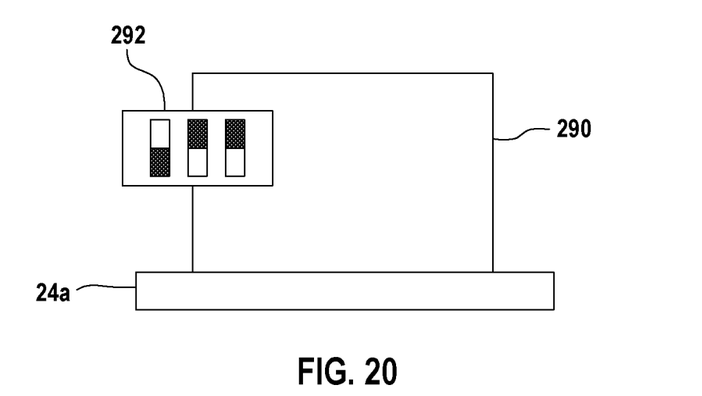
FIG. 20 illustrates the signal processing circuit of the interposer circuit carrier configured as a signal conditioning circuit.

FIG. 20 illustrates a signal processing circuit configured as a signal processing circuit 290. Processing circuit 290 is intended to process an RTD signal, and includes a DIP switch 292 for selecting a 2-conductor, 3-conductor, or 4-conductor RTD as input. The DIP switch 292 is located where it is accessible even if the interposer circuit carrier 22 is sandwiched between other circuit carriers 22 mounted on the base assembly.

Figure 21:
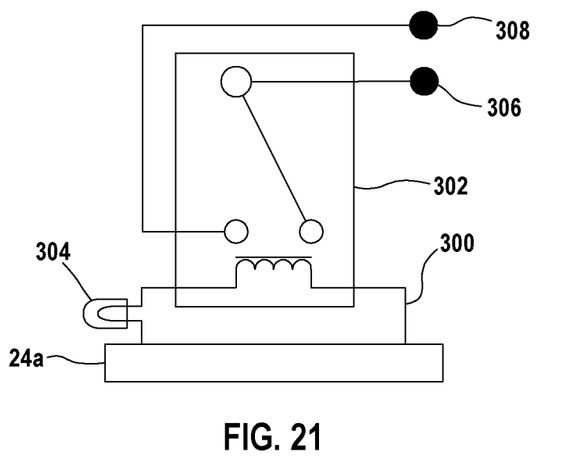
FIG. 21 illustrates the signal processing circuit of the interposer circuit carrier configured as a relay circuit.

Signal processing circuits 40 configured as relay circuits include relays used between I/O devices and controllers for level and power adjustment. FIG. 21 illustrates a signal processing circuit configured as a relay circuit 300. The relay circuit 300 includes a relay 302 shown schematically in the figure and an indication light 304 indicating the operating state of the relay 302. The relay 302 includes a power terminal 306 and a load terminal 308. The I/O input signal 16 when "on" switches the relay "on" to connect or disconnect the power terminal 306 with the load terminal 30, and when the I/O input signal 16 is "off" switches the relay "off". A single signal interposer circuit carrier 22 receives the I/O input signal and transmits the digital output signal to control the relay without the need for a separate input module and output module. In an alternative embodiment, the power terminal 306 can be eliminated and the power supplied from the base as previously described.

While this disclosure discloses and describes one or more embodiments, it is understood that this is capable of modification and that the disclosure is not limited to the precise details set forth, but includes such changes and alterations as fall within the purview of the following claims.

The invention claimed is:

1. A universal input/output (I/O) interposer system for processing an I/O signal transmitted between an I/O field device and a controller, the system comprising:
   a base, an interposer circuit carrier, and an electrical connector;
   the electrical connector comprising a first connector half attached to the base and a second connector half attached to the interposer circuit carrier, the first and second connector halves being selectively engageable with one another to attach the interposer circuit carrier to the base;
   the interposer circuit carrier comprising a signal processing circuit in electrical circuit communication with the second connector half, the signal processing circuit comprising an input section, a processing section, and an output section, the input section being configured to receive an I/O signal from the second connector half, the signal processing section being configured to process the I/O signal received by the input section, and the output section being configured to receive the processed I/O signal from the processing section and output the processed I/O signal to the second connector half;
   the base comprising a field-side terminal for electrical connection with an I/O signal line extending from the I/O field device, a controller-side terminal for electrical connection with an I/O signal line extending to the controller, the field-side terminal being in electrical circuit communication with the first connector half, and the connector-side terminal being in electrical connection with the first connector half to define a base interposer circuit segment extending from the field-side terminal to the second connector half and from the second connector half to the controller-side terminal;
   the electrical connector forming first and second electrical signal connections between the first and second connector halves when the first and second connector halves are engaged with one another, the first electrical signal connection electrically connecting the field side terminal with one of the intake section and the output section of the signal processing circuit and the second electrical connection electrically connecting the controller-side terminal with the other of the intake section and the output section of the signal processing circuit wherein the I/O signal is received by one of the field-side terminal and the controller-side terminal and the processed I/O signal is received by and is accessible from the other of the field-side terminal and the controller-side terminal for further transmission of the processed I/O signal away from the universal I/O interposer system and to the field device or to the controller; and
   the interposer circuit carrier being selectively attachable and detachable from the base without requiring removal of the signal lines from the terminals.

2. The universal I/O interposer system of claim 1 wherein the signal processing circuit comprises a fusing element disposed in series between the first connector half and the second connector half when the first and second connector halves are engaged with one another.

3. The universal I/O interposer system of claim 2 wherein the signal processing circuit comprises a blown fuse indicator.

4. The universal I/O interposer system of claim 1 wherein the base interposer circuit segment comprises a power terminal configured to be connected to a power source, the second connector half being electrically connected to the power terminal.

5. The universal I/O interposer system of claim 4 wherein the first connector half is configured to form a first power connection with the second connector half when the connector halves are engaged with one another, the first power connection electrically connecting the power terminal to one or both of the field-side terminal and the controller-side terminal.

6. The universal I/O interposer system of claim 4 wherein the second connector half is configured to not form a power connection with the first connector half when the connector halves are engaged with one another.

7. The universal I/O interposer system of claim 1 wherein the base comprises a fusing element connected electrically in series between the first connector half and the field-side terminal or the controller-side terminal.

8. The universal I/O interposer system of claim 7 wherein the fusing element is disposed in series between the output section of the signal processing circuit and the terminal connected to the fusing element.

9. The universal I/O interposer system of claim 1 wherein the signal processing circuit includes a manually-operated circuit breaker.

10. The universal I/O interposer system of claim 1 wherein the signal processing circuit is a relay circuit.

11. The universal I/O interposer system of claim 1 wherein the signal processing circuit is a signal conditioning circuit.

12. The universal I/O interposer system of claim 1 wherein the signal processing circuit is a pass-through circuit.

13. The universal I/O interposer system of claim 1 wherein the signal processing circuit is an electrical protection circuit.

14. The universal I/O interposer system of claim 1 wherein the base comprises one or more additional terminals configured for terminating respective shield lines of the signal line extending from the I/O device.

15. The universal I/O interposer system of claim 1 wherein the base comprises a board, the second electrical connector attached to the board, the field-side terminal and the controller side terminal carried in respective terminal blocks.

16. The universal I/O interposer system of claim 1 wherein the base comprises a plurality of like base interposer circuit segments, the field-side terminal and the controller-side terminal of each base interposer circuit segment being configured to transmit an I/O signal only to and from the first connector half of the base interposer circuit and not to any of the other base interposer circuit segments whereby I/O signals received by the universal I/O interposer assembly are received and processed independently of one another, and the processed I/O signals generated by the universal I/O interposer system are output independently of one another.

17. The universal I/O interposer system of claim 16 wherein the controller-side terminals of the plurality of base interposer circuit segments are contained in a third electrical connector half.

18. The universal I/O interposer system of claim 16 wherein the base comprises a first power terminal configured to be connected to a power source and each base interposer circuit segment comprises a second power terminal electrically connected to the field-side terminal, the first power terminal connected to the second power terminals by a power bus.

19. The universal I/O interposer system of claim 4 wherein the base comprises a plurality of like base interposer circuit segments sharing a common power terminal and a first power bus extending from the power terminal to each second connector half to electrically connect each second connector half to the power terminal.

20. The universal I/O interposer system of claim 19 wherein the base comprises a second power terminal and a second power bus extending from the second power terminal to each second connector half.

* * * * *

UNITED STATES PATENT AND TRADEMARK OFFICE
CERTIFICATE OF CORRECTION

PATENT NO. : 9,971,727 B2
APPLICATION NO. : 15/028206
DATED : May 15, 2018
INVENTOR(S) : Brodbeck et al.

Page 1 of 1

It is certified that error appears in the above-identified patent and that said Letters Patent is hereby corrected as shown below:

In the Claims

Claim 15, Column 13, Line 1, insert after "connector" --half--.

Signed and Sealed this
Twenty-fourth Day of July, 2018

Andrei Iancu
*Director of the United States Patent and Trademark Office*